(12) United States Patent
Shi

(10) Patent No.: US 12,043,751 B1
(45) Date of Patent: Jul. 23, 2024

(54) HIGHLY-ENVIRONMENT-FRIENDLY DISPOSABLE PP SPRAY OIL FOR TOYS

(71) Applicant: Hang Cheung Coatings (Hui Yang) Ltd., Huizhou (CN)

(72) Inventor: Jinbo Shi, Huizhou (CN)

(73) Assignee: HANG CHEUNG COATINGS (HUI YANG) LTD., Huizhou (CN)

( * ) Notice: Subject to any disclaimer, the term of this patent is extended or adjusted under 35 U.S.C. 154(b) by 0 days.

(21) Appl. No.: 18/626,615

(22) Filed: Apr. 4, 2024

(30) Foreign Application Priority Data

May 9, 2023 (CN) .......................... 202310513101.8

(51) Int. Cl.
| | |
|---|---|
| *C09D 123/28* | (2006.01) |
| *C09D 5/02* | (2006.01) |
| *C09D 7/20* | (2018.01) |
| *C09D 7/47* | (2018.01) |
| *C09D 7/65* | (2018.01) |

(52) U.S. Cl.
CPC ........... *C09D 123/28* (2013.01); *C09D 5/021* (2013.01); *C09D 7/20* (2018.01); *C09D 7/47* (2018.01); *C09D 7/65* (2018.01)

(58) Field of Classification Search
CPC .......... C09D 123/28; C09D 7/65; C09D 7/20; C09D 7/47; C09D 5/021
See application file for complete search history.

(56) References Cited

FOREIGN PATENT DOCUMENTS

| CN | 104804537 A | 7/2015 |
|---|---|---|
| CN | 116023827 A | 4/2023 |

OTHER PUBLICATIONS

CNIPA, Notification of First Office Action for Chinese application CN202310513101.8, Sep. 20, 2023.
CNIPA, Notification to grant patent right for Chinese application CN202310513101.8, Jan. 31, 2024.

*Primary Examiner* — John E Uselding
(74) *Attorney, Agent, or Firm* — Zhigang Ma

(57) ABSTRACT

A highly-environment-friendly disposable PP spray oil for toys, which includes the following components in parts by mass: 30 to 69.3 parts of ester-soluble chlorinated polypropylene resin, 3 to 6 parts of chlorinated polyether resin, 5 to 8 parts of high-Tg-value acrylic resin, 4 to 6 parts of benzene-free and ketone-free alkyd resin, 3 to 5 parts of keto-aldehyde resin, 2 to 4 parts of PP adhesion promoter, 0.1 to 0.5 part of leveling agent, 0.1 to 0.5 part of defoamer, 3 to 5 parts of propylene glycol methyl ether acetate, 8 to 15 parts of butyl acetate and 2.5 to 20 parts of toner. The disposable PP spray oil may be directly sprayed to a PP substrate without any pretreatment. A paint film prepared from the disposable PP spray oil will not be corroded or decolorized after being wiped with a sanitizer for one minute, especially instant hand sanitizers.

4 Claims, No Drawings

//1//
HIGHLY-ENVIRONMENT-FRIENDLY DISPOSABLE PP SPRAY OIL FOR TOYS

CROSS-REFERENCE TO RELATED APPLICATIONS

The present application claims priority of China Patent Application No. 202310513101.8, filed on May 9, 2023, the contents of which are incorporated herein by reference.

BACKGROUND OF THE INVENTION

A PP material, also known as Polypropylene, is a polymer prepared from acrylic acid by an addition polymerization reaction. The PP material is widely applied in numerous fields such as toys, machinery, automobiles, packaging and food industry owing to its characteristics of no odor, no taste, no toxicity, light weight, good toughness, good heat resistance, good chemical resistance, good plasticity, favorable processing performance, and the like. In order to achieve better decoration and protection effects on formed PP toys or other PP workpieces, it is necessary to coat a layer of paints with different colors and textures. However, the PP material is very hardly attached directly by common paints due to its resistance to a solvent, low surface energy, small polarity and poor wettability. In traditional technologies, this problem is solved by spraying a treating agent (commonly known as PP water) on the surface of the PP material and then spraying ordinary paints.

With the further improvement for the environmental protection requirements in the toy industry, in addition to the continuous improvement for the environmental protection requirements of heavy metals, phthalates, polycyclic aromatic hydrocarbons, bisphenol A and formaldehyde as stipulated by the national and international standards, as well as laws and regulations, internal testing requirements and standards of each toy store are also constantly updated and improved. For example, Ferrero Toy Store requires used paints to be free of benzene and ketone, and McDonald's Toy Store requires used paints to be free of toluene, xylene and butanone. During the COVID-19 epidemic, with the people's attention and popularization of daily protection in terms of cleaning, hygiene and disinfection, Walch Instant Hand Sanitizers, Dettol Instant Hand Sanitizers and Soft-Care Med Instant Hand Sanitizers have become the main commonly used hand sanitizers for daily health protection and disinfection. McDonald's Toy Store found that the SoftCare Med Instant Hand Sanitizers had corrosion and decolorization phenomena for paint films of ordinary hard rubber one-component toys and PP paint films of ordinary disposable toys while performing washing and disinfection test on toys with hand sanitizers (other brands such as Walch Instant Hand Sanitizer and Dettol Instant Hand Sanitizer had not been found to corrode and decolorize the paint films of the toys), so McDonald's Toy Store's internal test had added a new requirement of resisting wiping with sanitizers for toy paint films.

The existing ordinary disposable PP spray oil can neither meet highly-environment-friendly benzene-free and ketone-free requirements of the Ferrero Toy Store, nor can it meet toluene-free, xylene-free and butanone-free requirements of McDonald's Toy Store, and cannot meet the requirements of McDonald's Toy Store for sanitizer-wiping resistance test. Therefore, how to provide a highly-environment-friendly (benzene-free and ketone-free) sanitizer-resistant disposable PP spray oil on the basis of ensuring excellent adhesion has become a technical problem that needs to be solved urgently.

SUMMARY OF THE INVENTION

An objective of the present disclosure is to provide a highly-environment-friendly sanitizer-resistant disposable PP spray oil.

A highly-environment-friendly sanitizer-resistant disposable PP spray oil for toys, which includes the following components: an ester-soluble chlorinated polypropylene resin, a chlorinated polyether resin, a high-Tg-value acrylic resin, a benzene-free and ketone-free alkyd resin, a keto-aldehyde resin, a PP adhesion promoter, a leveling agent, a defoamer, propylene glycol methyl ether acetate, butyl acetate and a toner.

Preferably, the highly-environment-friendly sanitizer-resistant disposable PP spray oil for toys includes the above components in parts by mass: 30 to 69.3 parts of ester-soluble chlorinated polypropylene resin, 3 to 6 parts of chlorinated polyether resin, 5 to 8 parts of high-Tg-value acrylic resin, 4 to 6 parts of benzene-free and ketone-free alkyd resin, 3 to 5 parts of keto-aldehyde resin, 2 to 4 parts of PP adhesion promoter, 0.1 to 0.5 part of leveling agent, 0.1 to 0.5 part of defoamer, 3 to 5 parts of propylene glycol methyl ether acetate, 8 to 15 parts of butyl acetate and 2.5 to 20 parts of toner.

Preferably, the ester-soluble chlorinated polypropylene resin has a solid content of 46±2%. This resin abandons a chlorinated polypropylene resin that is mainly dissolved with toluene/xylene, in order to meet highly-environment-friendly benzene-free and ketone-free requirements. Rich colors of toy paints and different hiding power requirements on different PP substrates result in different proportions of the toner, so the proportions of the ester-soluble chlorinated polypropylene resin to oils in different colors and different hiding power are different. In the case of 2.5 to 20 parts by weight of toner, the ester-soluble chlorinated polypropylene resin accounts for 30 to 69.3 parts by weight.

Preferably, the chlorinated polyether resin includes BASF Laroflex MP-45 solid resin; and the high-Tg-value acrylic resin has a Tg value (glass transition temperature) of at least 90° C., and a solid content of 50±2%. The chlorinated polyether resin and the high-Tg-value acrylic resin can be used in the formula to increase the chemical resistance of paint films, make the paint films resistant to sanitizer test requirements, and improve the solvent release to shorten the surface drying time of the paint films.

Preferably, the benzene-free and ketone-free alkyd resin is an environment-friendly benzene-free and ketone-free alkyd resin and has a solid content of 70±2%; and the keto-aldehyde resin is a solid resin. The benzene-free and ketone-free alkyd resin and the keto-aldehyde resins can be used in the formula to increase and balance the miscibility of components, improve the paint gloss, further improve the atomization performance of construction, and also improve the adhesion of the paint films on a PP substrate.

Preferably, the PP adhesion promoter includes chlorinated polyolefin, has a solid content of 40±2%, and can be used in the formula to enhance the adhesion between the paint and the PP substrate.

As an implementation, the leveling agent includes a polyether modified polysiloxane leveling agent, which has very good water-resistant, oil-resistant and leveling effects.

As an implementation, the defoamer includes a polysiloxane defoamer, which has strong foam-breaking ability in the paint manufacturing and construction process and has a good defoaming effect.

Specifically, the propylene glycol methyl ether acetate can adjust the solubility and dryness of the resins; the butyl acetate can improve the solubility of the resins; and the toner can be proportionally adjusted according to the needs due to rich colors of toy paints and different requirements for hiding power on different PP substrates, but the type of the toner is not particularly limited.

According to another aspect of the present invention, a sanitizer-resistant paint film for PP toys is prepared from the highly-environment-friendly sanitizer-resistant disposable PP spray oil as described above. The highly-environment-friendly sanitizer-resistant disposable PP spray oil may be sprayed to a surface of a toy with a PP substrate.

The highly-environment-friendly sanitizer-resistant disposable PP spray oil of the present invention resists to sanitizers including SoftCare Med Instant Hand Sanitizer, which consists of n-propanol, isopropanol, water, glycerol, hydroxypropyl cellulose, and isopropyl palmitate, taking 44 to 55% of n-propanol and 17 to 23% of isopropanol by volume as main effective ingredients. In addition, the highly-environment-friendly sanitizer-resistant disposable PP spray oil of the present invention also meets the requirement of resistance to other sanitizers, such as Walch Instant Hand Sanitizer which consists of ethanol and water, taking 55 to 65% of ethanol by volume as a main active ingredient; and Dettol Instant Hand Sanitizer which includes ethanol and water, taking 55 to 65% of ethanol by volume as a main active ingredient. A paint film of the highly-environment-friendly sanitizer-resistant disposable PP spray oil for toys is mainly resistant to isopropyl palmitate, n-propanol, isopropanol, glycerol and ethanol in components of hand sanitizers in the wiping process.

The present invention has the following advantages: the disposable PP spray oil provided by the present invention may be directly sprayed to a PP substrate without any pretreatment, achieving excellent adhesion and meeting highly-environment-friendly benzene-free and ketone-free requirements. In other words, achieving benzene-free, ketone-free, highly-environment-friendly and sanitizer-wiping resistant requirements under the conditions of no benzene solvent and excellent adhesion, while ensuring that the dryness and construction performances of paint films have been greatly improved. The sprayed paint film is short in surface drying time and higher in gloss, has good leveling property and apparent effects, is stable in adhesion to different PP substrates, and can resist the wiping with a sanitizer, especially SoftCare Med Instant Hand Sanitizer.

DETAILED DESCRIPTION OF THE INVENTION

The invention will now be described in detail through several embodiments.

The highly-environment-friendly sanitizer-resistant disposable PP spray oil is used to be sprayed on a toy with a PP substrate. The following table 1 is a formula table of three examples (the present invention) and three comparative examples (commercially available ordinary disposable PP spray oils) used in the construction of toys, and the preparation method include conventional mixing and grinding in the art.

TABLE 1

Formula table of examples and comparative examples

| Paint component/ parts by mass | Black paint | | White paint | | Silver paint | |
| --- | --- | --- | --- | --- | --- | --- |
| | Example 1 | Comparative example 1 | Example 2 | Comparative example 2 | Example 3 | Comparative example 3 |
| Ester-soluble chlorinated polypropylene resin (solid content of 46 ± 2%) | 58.6 | / | 43.7 | / | 57.1 | / |
| Benzene-soluble chlorinated polypropylene resin (solid content of 46 ± 2%) | / | 69.3 | / | 52.85 | / | 67.3 |
| Chlorinated polyether resin (BASF Laroflex MP-45) | 5.5 | / | 5 | / | 5 | / |
| High-Tg-value (90 degree Celsius (° C.)) acrylic resin (solid content of 50 ± 2%) | 6 | / | 5 | / | 6.5 | / |
| Modified acrylic resin | / | 6 | / | 5 | / | 6.5 |
| Benzene-free and ketone-free alkyd resin (solid content of 70 ± 2%) | 5.5 | / | 5 | / | 5 | / |
| Benzene-soluble alkyd resin (solid content of 70 ± 2%) | / | 7.5 | / | 7 | / | 8 |
| Keto-aldehyde resin (solid resin) | 4 | / | 4 | / | 4 | / |
| PP adhesion promoter (chlorinated polyolefin) | 3 | 2 | 2.5 | 2 | 3 | 2 |
| Polyether modified siloxane leveling agent | 0.2 | 0.2 | 0.15 | 0.15 | 0.2 | 0.2 |
| Polysiloxane defoamer | 0.2 | / | 0.15 | / | 0.2 | / |
| Propylene glycol methyl ether acetate | 4 | / | 3.5 | / | 4.5 | / |

TABLE 1-continued

Formula table of examples and comparative examples

| Paint component/ parts by mass | Black paint | | White paint | | Silver paint | |
|---|---|---|---|---|---|---|
| | Example 1 | Comparative example 1 | Example 2 | Comparative example 2 | Example 3 | Comparative example 3 |
| Butyl acetate | 10 | / | 11 | / | 9.5 | / |
| Xylene | / | 12 | / | 13 | / | 11 |
| Black powder | 3 | 3 | / | / | / | / |
| Silver powder | / | / | / | / | 5 | 5 |
| Titanium dioxide | / | / | 20 | 20 | / | / |

The above examples and comparative examples were diluted with a diluent and sprayed (a dilution mass ratio of black paint to diluent is 1:1.1; a dilution mass ratio of white paint to diluent is 1:0.8; and a dilution mass ratio of silver paint to diluent is 1:1.3) and then air-dried at room temperature; and various performances were tested according to conventional testing methods in the art, which will not be specially described.

It should be specially noted that a test method for sanitizer resistance adopts a test method of the McDonald's Toy Store on paint films of toys. This test method includes the following steps: dripping a sanitizer on a tested paint film and wiping it by hand for 30 seconds, and keeping the wet sanitizer always on the paint film during the wiping process; after 30 seconds, dripping the sanitizer again in the same position and wiping it by hand for 30 seconds; and observing whether the paint film is corroded or decolorized, and regarding the paint film that is corrode and decolorized (if any) as the intolerance to the sanitizer.

The test results were shown in Table 2:

TABLE 2

Performance test results of examples and comparative examples

| Test items | Black paint | | White paint | | Silver paint | |
|---|---|---|---|---|---|---|
| | Example 1 | Comparative example 1 | Example 2 | Comparative example 2 | Example 3 | Comparative example 3 |
| Analysis results of solvent ingredients of paint before dilution | Butyl acetate, propylene glycol methyl ether acetate | Xylene, cyclohexanone, toluene | Butyl acetate, propylene glycol methyl ether acetate | Xylene, cyclohexanone, toluene | Butyl acetate, propylene glycol methyl ether acetate | Xylene, cyclohexanone, toluene |
| Adhesion (PP substrates of eight different toys, cross-cut test) | Grade 1 (5B) | Grade 1 (5B) | Grade 1 (5B) | Grade 1 (5B) | Grade 1 (5B) | Grade 1 (5B) |
| Surface drying/30° C. | 3 minutes | 3 minutes and 40 seconds | 2 minutes and 50 seconds | 3 minutes and 20 seconds | 3 minutes and 10 seconds | 3 minutes and 45 seconds |
| Press drying/30° C. | 16 minutes | 28 minutes | 15 minutes | 25 minutes | 16 minutes | 27 minutes |
| Gloss (gloss meter 60° test) | 88.5-90 | 86-87 | 85-86 | 83-84.5 | 78-79 | 75-76 |
| Plate-making (plate-spraying) appearance | Flat and smooth | Flat and smooth | Flat and smooth | Flat and smooth | Flat and smooth | Flat and smooth |
| sanitizer resistance test (SoftCare Med Hand sanitizer) | The paint film has no dissolution and decoloration | The paint film has been dissolved and seriously decolorized | The paint film has no dissolution and decoloration | The paint film has been dissolved and seriously decolorized | The paint film has no dissolution and decoloration | The paint film has been dissolved and seriously decolorized |
| sanitizer resistance test (Walch Instant Hand Sanitizer) | The paint film has no dissolution and decoloration | The paint film has no dissolution and decoloration | The paint film has no dissolution and decoloration | The paint film has no dissolution and decoloration | The paint film has no dissolution and decoloration | The paint film has no dissolution and decoloration |
| sanitizer resistance test (Dettol Instant Hand Sanitizer) | The paint film has no dissolution and decoloration | The paint film has no dissolution and decoloration | The paint film has no dissolution and decoloration | dissolution and The paint film has no decoloration | The paint film has no dissolution and decoloration | dissolution and The paint film has no decoloration |

TABLE 2-continued

Performance test results of examples and comparative examples

| Test items | Black paint | | White paint | | Silver paint | |
|---|---|---|---|---|---|---|
| | Example 1 | Comparative example 1 | Example 2 | Comparative example 2 | Example 3 | Comparative example 3 |
| Construction performance | Atomized fine particles without wire drawing | Atomized fine particles without wire drawing | Atomized fine particles without wire drawing | Atomized fine particles without wire drawing | Atomized fine particles without wire drawing | Atomized fine particles without wire drawing |
| Paint film thickness | 21-22 μm | 20.5-21.5 μm | 26-27 μm | 26.5-27.5 μm | 18-19 μm | 17.5-18.5 μm |
| Leveling property | Flat surface with good leveling property | Flat surface with good leveling property | Flat surface with good leveling property | Flat surface with good leveling property | Flat surface with good leveling property | Flat surface with good leveling property |
| Paint storage stability (30 days at 50° C.) | No stratification, no precipitation, no thickening, and stable performances | No stratification, no precipitation, no thickening, and stable performances | No stratification, no precipitation, no thickening, and stable performances | No stratification, no precipitation, no thickening, and stable performances | No stratification, no precipitation, no thickening, and stable performances | No stratification, no precipitation, no thickening, and stable performances |

Through test results of various related performances of the examples and comparative examples, it can be seen that a paint mixed solvent of the present invention is butyl acetate and propylene glycol methyl ether acetate, which, under the premise of ensuring excellent adhesion, achieves highly-environment-friendly benzene-free and ketone-free requirements. Tests of resistance to the SoftCare Med Instant Hand Sanitizer, the Walch Instant Hand Sanitizer and the Dettol Instant Hand Sanitizer have reached the standards (especially the SoftCare Med Instant Hand Sanitizer), wherein the paint films have no corrosion and no decolorization, and meanwhile, the dryness of the paint has been greatly improved and promoted.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A highly-environment-friendly disposable PP spray oil for toys whose paint film will not be corroded or decolorized after being wiped with a sanitizer for one minute, wherein the PP spray oil consists of the following components in parts by mass:
   30 to 69.3 parts of ester-soluble chlorinated polypropylene resin;
   3 to 6 parts of chlorinated polyether resin;
   5 to 8 parts of high-Tg-value acrylic resin;
   4 to 6 parts of benzene-free and ketone-free alkyd resin;
   3 to 5 parts of keto-aldehyde resin;
   2 to 4 parts of PP adhesion promoter;
   0.1 to 0.5 part of leveling agent;
   0.1 to 0.5 part of defoamer;
   3 to 5 parts of propylene glycol methyl ether acetate;
   8 to 15 parts of butyl acetate; and
   2.5 to 20 parts of toner;
   wherein the PP adhesion promoter comprises chlorinated polyolefin;
   the ester-soluble chlorinated polypropylene resin has a solid content of 46±2%;
   the chlorinated polyether resin comprises a solid resin;
   the high-Tg-value acrylic resin has a Tg value of at least 90° C., and a solid content of 50±2%;
   the benzene-free and ketone-free alkyd resin has a solid content of 70±2%;
   the keto-aldehyde resin is a solid resin;
   the highly-environment-friendly disposable PP spray oil for toys is free of a benzene solvent; and
   the sanitizer is an instant hand sanitizer.

2. The highly-environment-friendly disposable PP spray oil for toys according to claim 1, wherein the leveling agent comprises a polyether modified polysiloxane leveling agent, and the defoamer comprises a polysiloxane defoamer.

3. A paint film for PP toys, which will not be corroded or decolorized after being wiped with a sanitizer for one minute, wherein the paint film is prepared from the highly-environment-friendly disposable PP spray oil according to claim 1.

4. A paint film for PP toys, which will not be corroded or decolorized after being wiped with a sanitizer for one minute, wherein the paint film is prepared from the highly-environment-friendly disposable PP spray oil according to claim 2.

* * * * *